US011097720B2

(12) United States Patent
Tsuda

(10) Patent No.: US 11,097,720 B2
(45) Date of Patent: Aug. 24, 2021

(54) CONTROL DEVICE FOR HYBRID VEHICLE

(71) Applicant: TOYOTA JIDOSHA KABUSHIKI KAISHA, Toyota (JP)

(72) Inventor: Satoshi Tsuda, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 118 days.

(21) Appl. No.: 16/384,243

(22) Filed: Apr. 15, 2019

(65) Prior Publication Data

US 2019/0351892 A1 Nov. 21, 2019

(30) Foreign Application Priority Data

May 17, 2018 (JP) .............................. JP2018-095363

(51) Int. Cl.
*B60W 20/13* (2016.01)
*B60K 6/26* (2007.10)
(Continued)

(52) U.S. Cl.
CPC .............. *B60W 20/13* (2016.01); *B60K 6/26* (2013.01); *B60K 6/365* (2013.01); *B60K 6/40* (2013.01);
(Continued)

(58) Field of Classification Search
CPC ........ B60K 6/26; B60K 6/445; B60R 16/033; B60R 10/06; B60R 10/08; B60R 20/13; B60R 2510/0657; B60R 2710/0605; B60R 2710/0644; B60R 2710/244; B60R 20/11; B60R 2510/244; B60R 2520/10;
(Continued)

(56) References Cited

U.S. PATENT DOCUMENTS

| 6,553,287 | B1 * | 4/2003 | Supina | .................. | B60W 10/06 |
| | | | | | 701/22 |
| 8,509,980 | B2 * | 8/2013 | Abe | ...................... | B60W 20/00 |
| | | | | | 701/22 |
| 2007/0204830 | A1 * | 9/2007 | Andri | ..................... | B60K 6/445 |
| | | | | | 123/198 F |
| 2007/0204838 | A1 * | 9/2007 | Leone | ................ | F02M 25/0827 |
| | | | | | 123/518 |

(Continued)

FOREIGN PATENT DOCUMENTS

| JP | 2003-125501 A | 4/2003 |
| JP | 2012-148751 A | 8/2012 |

(Continued)

*Primary Examiner* — Behrang Badii
*Assistant Examiner* — Daniel L Greene
(74) *Attorney, Agent, or Firm* — Sughrue Mion, PLLC

(57) ABSTRACT

A control device for a hybrid vehicle includes: an engine; an output shaft connected to a drive wheel; a first motor generator generating electric power using a drive force from the engine; a second motor generator connected to the output shaft; a planetary gear mechanism mechanically connected to the engine, the first motor generator, and the output shaft; a battery charging the electric power generated by the first motor generator; and controllers controlling the engine, the first motor generator, and the second motor generator. Further, when a requested drive force for the hybrid vehicle is greater than a maximum drive force without battery charging, which represents a drive force which can be output when an output of the second motor generator is maximized and the battery is not charged, the controllers cause the hybrid vehicle to travel while charging the battery.

6 Claims, 4 Drawing Sheets

(51) Int. Cl.
  *B60K 6/40*     (2007.10)
  *B60K 6/365*    (2007.10)
  *B60W 10/06*    (2006.01)
  *B60W 10/08*    (2006.01)
  *B60R 16/033*   (2006.01)

(52) U.S. Cl.
  CPC .......... *B60R 16/033* (2013.01); *B60W 10/06* (2013.01); *B60W 10/08* (2013.01); *B60W 2510/0657* (2013.01); *B60W 2710/0605* (2013.01); *B60W 2710/0644* (2013.01); *B60W 2710/244* (2013.01); *B60Y 2200/92* (2013.01); *B60Y 2300/91* (2013.01)

(58) Field of Classification Search
  CPC .......... B60R 2540/10; B60R 2710/083; B60R 30/1882; B60Y 2200/92; B60Y 2300/91; Y02T 10/62; Y02T 10/70; Y02T 10/7072; Y02T 90/14
  See application file for complete search history.

(56) References Cited

U.S. PATENT DOCUMENTS

| | | | |
|---|---|---|---|
| 2007/0205028 A1* | 9/2007 | Leone | B60W 20/00 180/65.28 |
| 2007/0205029 A1* | 9/2007 | Leone | B60W 20/15 180/65.225 |
| 2009/0118917 A1* | 5/2009 | Sah | B60W 10/02 701/54 |
| 2014/0349807 A1* | 11/2014 | Heap | B60W 10/06 477/3 |
| 2017/0334426 A1 | 11/2017 | Kato et al. | |
| 2019/0145331 A1* | 5/2019 | Dudar | F02D 41/0007 123/519 |
| 2019/0211765 A1* | 7/2019 | Dudar | F02D 41/062 |

FOREIGN PATENT DOCUMENTS

| | | | |
|---|---|---|---|
| JP | 2012-232714 A | 11/2012 | |
| JP | 2014-040199 A | 3/2014 | |
| JP | 2017-206105 A | 11/2017 | |
| WO | WO-2008111595 A1 * | 9/2008 | ............ B60W 10/26 |

* cited by examiner

CONTROL DEVICE FOR HYBRID VEHICLE

CROSS-REFERENCE TO RELATED APPLICATION(S)

The present application claims priority to and incorporates by reference the entire contents of Japanese Patent Application No. 2018-095363 filed in Japan on May 17, 2018.

BACKGROUND

The present disclosure relates to a control device for a hybrid vehicle.

In Japanese Laid-open Patent Publication No. 2012-232714, a technique is disclosed in which when a requested drive force, which is requested for a vehicle, is greater than a determined drive force which is predetermined, a first drive mode is performed to drive accessories of the vehicle by an electric motor after a clutch device is switched to a release state, thereby increasing power used to drive drive wheels and improving the acceleration performance of the vehicle.

However, according to the technique disclosed in Japanese Laid-open Patent Publication No. 2012-232714, when there is some restriction on the output of the electric motor, for example, when vehicle speed is low and possible output generated by the electric motor is low or when the output of the electric motor is limited due to heat restriction, it is difficult to obtain a sufficient drive force, and there is a possibility that the acceleration performance could not be improved.

SUMMARY

There is a need for providing a control device for a hybrid vehicle which is able to obtain a large drive force even when there is a restriction on the output of the motor.

According to an embodiment, a control device for a hybrid vehicle includes: an engine; an output shaft connected to a drive wheel; a first motor generator generating electric power using a drive force from the engine; a second motor generator connected to the output shaft; a planetary gear mechanism mechanically connected to the engine, the first motor generator, and the output shaft; a battery charging the electric power generated by the first motor generator; and controllers controlling the engine, the first motor generator, and the second motor generator. Further, when a requested drive force for the hybrid vehicle is greater than a maximum drive force without battery charging, which represents a drive force which can be output when an output of the second motor generator is maximized and the battery is not charged, the controllers cause the hybrid vehicle to travel while charging the battery.

DETAILED DESCRIPTION

An example configuration of a control device for a hybrid vehicle according to an embodiment of the present disclosure will be described with reference to the accompanied drawings. It should be noted that the present disclosure is not limited to the following embodiment(s). Furthermore, the components described in the following embodiments include the components which can be readily replaced by a person skilled in the art or substantially equivalent components.

Figure 1:
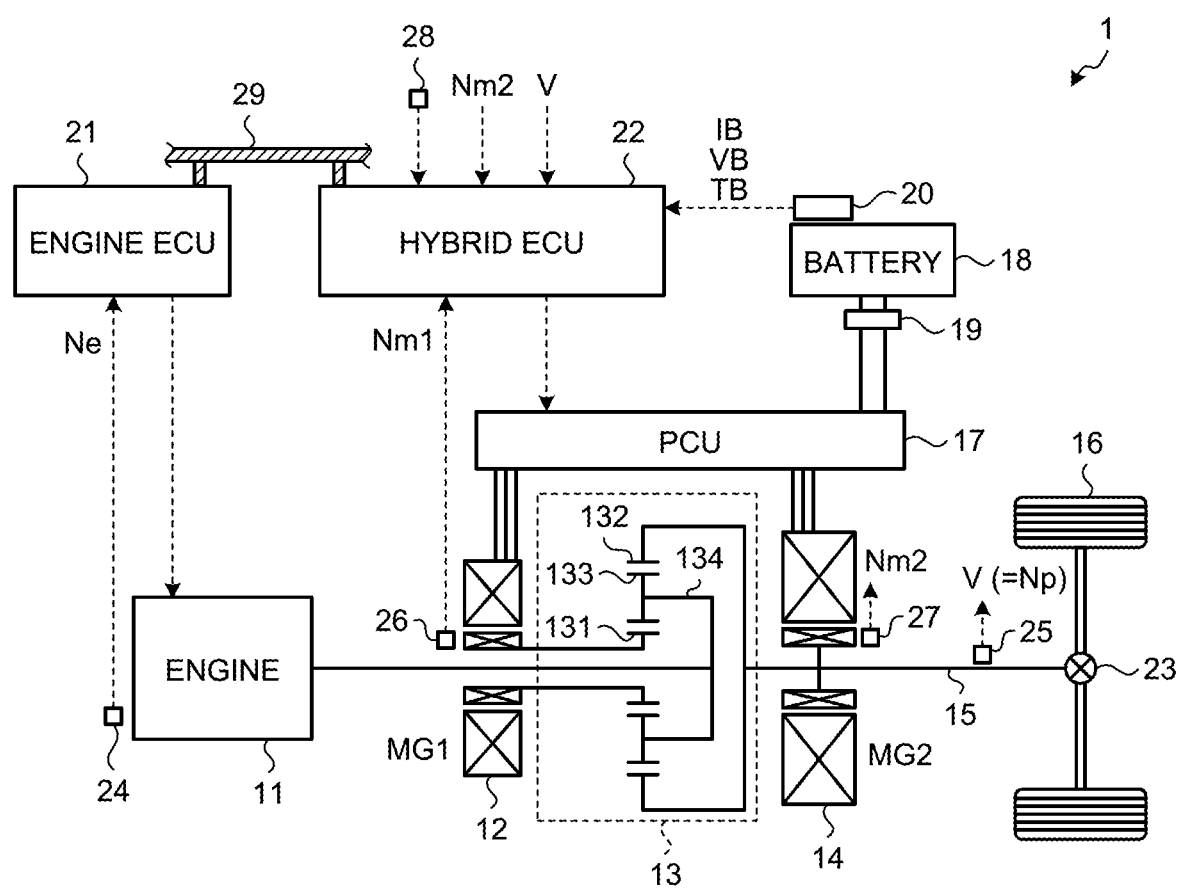
FIG. 1 is a diagram schematically illustrating an example configuration of a control device for a hybrid vehicle according to an embodiment of the present disclosure.

As illustrated in FIG. 1, a hybrid vehicle 1 includes an engine 11, a first motor generator 12 (MG1), a planetary gear mechanism 13, a second motor generator 14 (MG2), an output shaft 15, drive wheels 16, a Power Control Unit (PCU) 17, a battery 18 for traveling, a System Main Relay (SMR) 19, a monitoring unit 20, an engine Electronic Control Unit (ECU) 21, and a hybrid ECU 22. The engine ECU 21 and the hybrid ECU 22 described above function as a "control unit (controllers)" according to the present disclosure.

The hybrid vehicle 1 travels by using a power of at least one of the engine 11 and the second motor generator 14. In normal traveling, the hybrid vehicle 1 can switch traveling modes between motor traveling for traveling by using the power of the second motor generator 14 without using the power of the engine 11 and hybrid traveling (Hybrid Vehicle (HV) traveling) for traveling by using the power of both the engine 11 and the second motor generator 14.

The engine 11 burns fuel to output power. The first motor generator 12 and the second motor generator 14 are Alternating-Current (AC) rotary electric machines and function as both motor and generator. The first motor generator 12 according to the present embodiment generates a power by a drive force from the engine 11.

The planetary gear mechanism 13 is a single pinion planetary gear mechanism. The planetary gear mechanism 13 is not necessarily the single pinion planetary gear mechanism and may be, for example, a double pinion planetary gear mechanism. The planetary gear mechanism 13 mechanically couples the engine 11, the first motor generator 12, and the output shaft 15. Specifically, the planetary gear mechanism 13 includes a sun gear 131, a ring gear 132, a pinion gear 133 which meshes with the sun gear 131 and the ring gear 132, and a carrier 134 which holds the pinion gear 133 rotatably and orbitally.

The sun gear 131 is coupled to the first motor generator 12. Furthermore, the ring gear 132 is coupled to the output shaft 15. Still furthermore, the carrier 134 is coupled to the engine 11.

The output shaft 15 is connected to the drive wheels 16 on the right and left sides via a differential gear 23. Furthermore, the second motor generator 14 is connected to the output shaft 15. Thus, the ring gear 132, the second motor generator 14, the output shaft 15, and the drive wheel 16 rotate synchronously with each other.

The PCU 17 converts a high voltage DC power supplied from the battery 18 into an AC power and supplies the AC power to one or both of the first motor generator 12 and the second motor generator 14. Thus, one or both of the first motor generator 12 and the second motor generator 14 are driven. Furthermore, the PCU 17 converts the AC power generated by one or both of the first motor generator 12 and the second motor generator 14 into a DC power and supplies the DC power to the battery 18. Therefore, the battery 18 is charged. In addition, the PCU 17 also drives the second motor generator 14 by supplying a power generated by the first motor generator 12 to the second motor generator 14.

The battery 18 is a secondary battery which stores a high-voltage (for example, approximately 200 V) DC power for driving one or both of the first motor generator 12 and the second motor generator 14. The battery 18 may be, for example, a nickel hydride battery or a lithium-ion battery. The battery 18 according to the present embodiment is mainly charged with the electric power generated by the first motor generator 12.

The SMR 19 is a relay for connecting the battery 18 to the PCU 17 or disconnecting the battery 18 from the PCU 17. The monitoring unit 20 detects a voltage (battery voltage) VB of the battery 18, a current (battery current) IB flowing through the battery 18, and a temperature (battery temperature) TB of the battery 18.

Furthermore, the hybrid vehicle 1 is equipped with sensors such as an engine speed sensor 24, an output shaft speed sensor 25, resolvers 26 and 27, an accelerator opening degree sensor 28 and the like. The engine speed sensor 24 detects an engine speed Ne, and outputs a result of the detection to the engine ECU 21. The output shaft speed sensor 25 detects a rotation speed Np of the output shaft 15 as a vehicle speed V, and outputs a result of the detection to the hybrid ECU 22.

The resolver 26 detects an MG1 rotation speed Nm1, and outputs a result of the detection to the hybrid ECU 22. The resolver 27 detects an MG2 rotation speed Nm2, and outputs a result of the detection to the hybrid ECU 22. The accelerator opening degree sensor 28 detects an accelerator opening degree (accelerator pedal operation amount) representing a degree of accelerator opened by a user (driver), and outputs a result of the detection to the hybrid ECU 22.

Each of the engine ECU 21 and the hybrid ECU 22 includes a Central Processing Unit (CPU) and a memory, which are not illustrated, and performs a predetermined arithmetic process on the basis of information stored in the memory or information from each sensor.

The hybrid ECU 22 is connected to the engine ECU 21 via a communication line 29, communicates with the engine ECU 21, and integrally controls the entire hybrid vehicle 1 including the engine 11, the first motor generator 12, and the second motor generator 14.

Specifically, the hybrid ECU 22 calculates a requested drive force (hereinafter may be referred to as an "accelerator requested drive force") requested by the user for the hybrid vehicle 1, on the basis of the accelerator opening degree, the vehicle speed V or the like. The hybrid ECU 22 generates an engine command signal, an MG1 command signal, and an MG2 command signal so that the requested drive force is transmitted to the drive wheels 16.

Then, the hybrid ECU 22 outputs the MG1 command signal and the MG2 command signal to the PCU 17. In response to this, the PCU 17 controls output (specifically, the amount of current) of the first motor generator 12 and the second motor generator 14 to have a power specified by the MG1 command signal and the MG2 command signal.

Furthermore, the hybrid ECU 22 outputs the engine command signal to the engine ECU 21. In response to this, the engine ECU 21 controls output (more specifically, throttle opening degree, ignition timing, fuel injection amount, etc.) of the engine 11 so that the engine has the power specified by the engine command signal. Furthermore, the hybrid ECU 22 calculates a State Of Charge (SOC) of the battery 18.

Here, in a related-art control device, there exists a problem that, for example, when the second motor generator has some restriction on the output therefrom, it is difficult to obtain a sufficient drive force. The restriction on the output of the second motor generator occurs, for example, in a case where the vehicle speed is low and a possible output generated from the second motor generator is low, in a case where the output of the second motor generator is restricted by thermal restriction, in a case where the second motor generator Is in trouble, and in a case where the size of the second motor generator itself is small and an output is small accordingly.

Therefore, in the control device for the hybrid vehicle 1 according to the present embodiment, when the requested drive force (accelerator requested drive force) for the hybrid vehicle 1 is greater than a drive force (hereinafter referred to as a "maximum drive force without battery charging"), which can be output when the output of the second motor generator 14 is maximized and the battery 18 is not charged, the hybrid vehicle 1 is caused to travel while charging the battery 18 to increase the direct torque of the engine 11 and obtain a large drive force. That is, in the control device for the hybrid vehicle 1 according to the present embodiment, an item "charging request based on a drive force request during traveling" is added to, but has not been existed in the related art, the items of charging/discharging request determination, and the engine 11 is operated while charging the battery 18 during traveling. Thus, in the control device for the hybrid vehicle 1 according to the present embodiment, even when there is some restriction on the output of the second motor generator 14, a large drive force is obtained.

Hereinafter, a specific control procedure performed by the control device for the hybrid vehicle 1 according to the present embodiment will be described with reference to FIGS. 2 and 3. It should be noted that the control described below is executed mainly by the hybrid ECU 22. In addition, the processes in Steps S4 and S5 of FIG. 2, which are processes performed before Step S7 in response to a processing result of Step S2, may be performed at any timing after Step S2 and before Step S7.

First, the accelerator opening degree is detected by the accelerator opening degree sensor 28, and the vehicle speed is detected by the output shaft speed sensor 25 (Step S1). Subsequently, the hybrid ECU 22 calculates the accelerator requested drive force on the basis of the accelerator opening degree and the vehicle speed calculated in Step S1 (Step S2). Then, on the basis of the vehicle speed calculated in Step S1 and the accelerator requested drive force calculated in Step S2, the hybrid ECU 22 calculates vehicle traveling power (Step S3).

Next, on the basis of the accelerator opening degree and the vehicle speed calculated in Step S1 and the accelerator requested drive force calculated in Step S2, the hybrid ECU 22 refers to, for example, a previously prepared map or the like to calculate a vehicle loss power (Step S4). It should be noted that the "vehicle loss power" represents a power consumed, for example, by gear loss or brake drag.

Then, the hybrid ECU 22 executes a charging/discharging request determination process for the battery 18 (Step S5). In the charging/discharging request determination process, a presence or absence of each of charging/discharging requests, such as described in the followings (1) to (5), is determined:

(1) a stall charging request (2) a charging/discharging request with large SOC center deviation (3) a charging/discharging request for operation at a fuel efficiency point of the engine (4) a battery protection request (5) a charging request based on a drive force request during traveling Here, the request (1) herein refers to a charging request for increasing an engine direct torque required to start the hybrid vehicle 1, for example, by depressing both of the brake and the accelerator while the hybrid vehicle 1 is stopped. Furthermore, the request (2) herein refers to a charging/discharging request for bringing the SOC closer to a control center value when the SOC is separated from the preset control center value (for example, 55%). Furthermore, the request (3) herein refers to a charging/discharging request for operating the vehicle on a preset fuel efficient operating line (see FIG. 4, described below). In addition, the request (4) herein refers to a request for stopping charging when, for example, the SOC exceeds a preset upper limit value (for example, 80%). Then, the request (5) herein refers to a charging request, which is made when a large drive force is required during traveling of the hybrid vehicle 1.

The specific contents of the charging/discharging request determination process in Step S5 will be described with reference to FIG. 3. Of the charging/discharging requests shown in (1) to (5) described above, the requests (1) to (4) refer to related-art charging/discharging request items, and the request (5) refers to a charging/discharging request item, which is newly added in the control according to the present embodiment. Therefore, in FIG. 3, descriptions of the contents of the determination processes of (1) to (4) are herein omitted, and only the contents of the determination process of (5) is described.

First, the hybrid ECU 22 determines whether the accelerator requested drive force calculated in Step S2 is greater than the maximum drive force without battery charging (Step S51). When the accelerator requested drive force is greater than the maximum drive force without battery charging (YES in Step S51), the hybrid ECU 22 determines that there exists a battery charging request on the basis of the drive force request during traveling (Step S52), and ends the determination process. On the other hand, when the accelerator requested drive force is not greater than the maximum drive force without battery charging (NO in Step S51), the hybrid ECU 22 determines that there is no battery charging request based on the drive force request during traveling (Step S53), and ends the determination process. Hereinafter, returning to FIG. 2, the processes after Step S6 will be described.

After Step S5, the hybrid ECU 22 calculates an amount of battery requested charge and further calculates a battery requested power on the basis of the amount of battery requested charge (Step S6). A specific method of calculating the amount of battery requested charge in this step will be described later.

Then, the hybrid ECU 22 adds the vehicle loss power (sign: negative) calculated in Step S4 and the battery requested power (sign on power receiving side: positive, sign on discharging side: negative) calculated in Step S6 to the vehicle traveling power calculated in Step S3 to calculate a requested engine power (Step S7).

Subsequently, on the basis of the accelerator requested drive force calculated in Step S2, the battery requested power calculated in Step S6, and the requested engine power calculated in Step S7, the hybrid ECU 22 calculates the target engine speed, for example, by referring to a previously prepared map or the like (Step S8). Thus, the control device for the hybrid vehicle 1 according to the present embodiment optimally controls the target engine speed according to the battery requested power.

Figure 4:
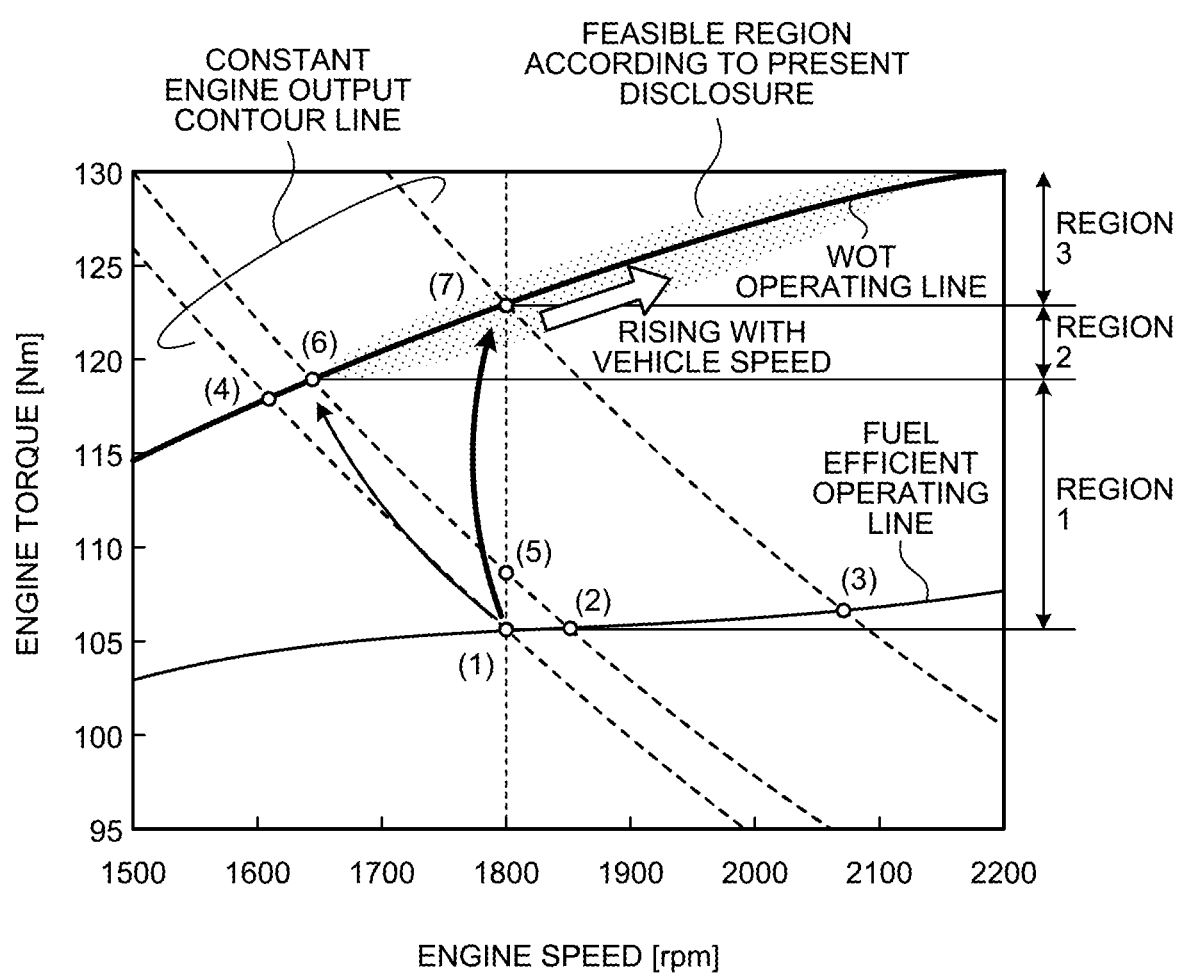
FIG. 4 is a graph illustrating an example of trial calculation of a drive force improvement rate performed in the control device for the hybrid vehicle according to an embodiment of the present disclosure.

Subsequently, the hybrid ECU 22 calculates an engine torque (Step S9). A specific method of calculating the engine torque in this step will be described later. In this step, it is desirable to calculate the engine torque on a Wide Open Throttle (WOT) operating line (see FIG. 4 illustrated later) indicating an engine speed at which the engine 11 can output a maximum torque. In the control device for the hybrid vehicle 1 according to the present embodiment, by selecting the engine torque on the WOT operating line as described above, it becomes possible to improve the drive force while minimizing the electrical loss and driving loss.

Next, the hybrid ECU 22 calculates an MG1 torque on the basis of the engine torque calculated in Step S9 (Step S10). Then, the hybrid ECU 22 calculates the engine direct torque on the basis of the MG1 torque calculated in Step S10 (Step S11). Finally, the hybrid ECU 22 calculates an MG2 torque on the basis of the engine direct torque calculated in Step S11 (Step S12).

In the control device for a hybrid vehicle according to the present embodiment that performs processing as described above, when the accelerator requested drive force exceeds the maximum drive force without battery charging and a large drive force is required, the hybrid vehicle 1 is caused to travel while charging the battery 18 to increase the engine direct torque mechanically directly transmitted from the engine 11 to the output shaft 15 via the planetary gear mechanism 13. Accordingly, even when the output of the second motor generator 14 is restricted and the output of the second motor generator 14 is limited (or the output itself is small), it is possible to respond to a large requested drive force. That is, even when the output of the second motor generator 14 is limited, a large drive force is obtained and acceleration performance can be improved.

Here, in related-art control, in a case where a high drive force request is made during traveling while the output from the second motor generator is restricted, an operating point of the engine, where the possible maximum drive force is obtained, is selected for operation in a state the battery is discharged or the battery is not charged. In contrast, in the control according to the present embodiment, the request to charge the battery 18 in response to the drive force request during traveling enables the operation with the maximum drive force by charging the battery 18 and selecting the operating point of the engine.

In the control device for the hybrid vehicle 1 according to the present embodiment, when "accelerator requested drive force>maximum drive force without battery charging" (YES in Step S51) while the hybrid vehicle 1 travels and the hybrid vehicle 1 is caused to travel while charging the battery 18, the power stored in the battery 18 may be supplied to accessories in the hybrid vehicle 1, causing the battery 18 to discharge the power. In the control device for the hybrid vehicle 1 according to the present embodiment, the electric power stored in the battery 18 is supplied to the accessories in this way to prevent an excessive amount of charge in the battery caused by charging operation.

It is noted that examples of the accessories provided in the hybrid vehicle 1 include media AV devices, such as an air conditioner, an electric heater, and a navigation device, electric operating components (grille shutter, variable spoiler, etc.) of the hybrid vehicle 1 and the like.

Arbitration of Charging/Discharging Request

Figure 2:
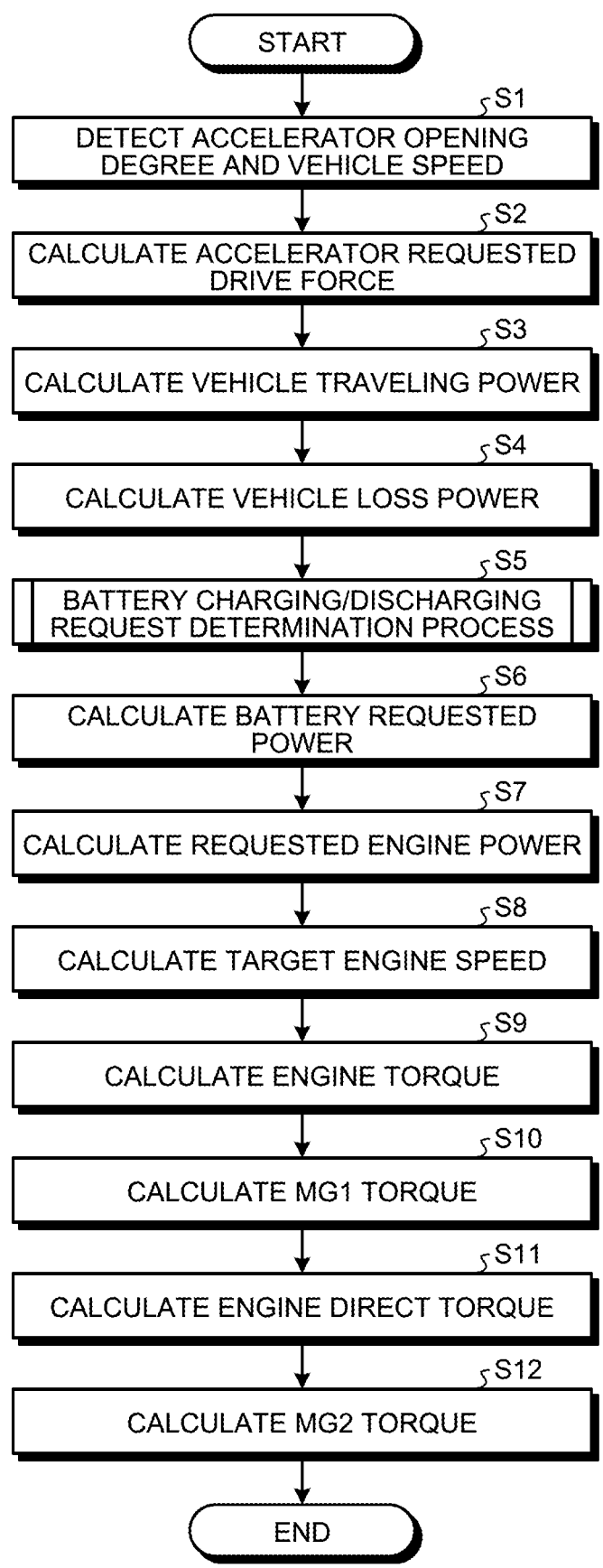
FIG. 2 is a flowchart illustrating a control method performed by the control device for the hybrid vehicle according to the embodiment of the present disclosure.
Figure 3:
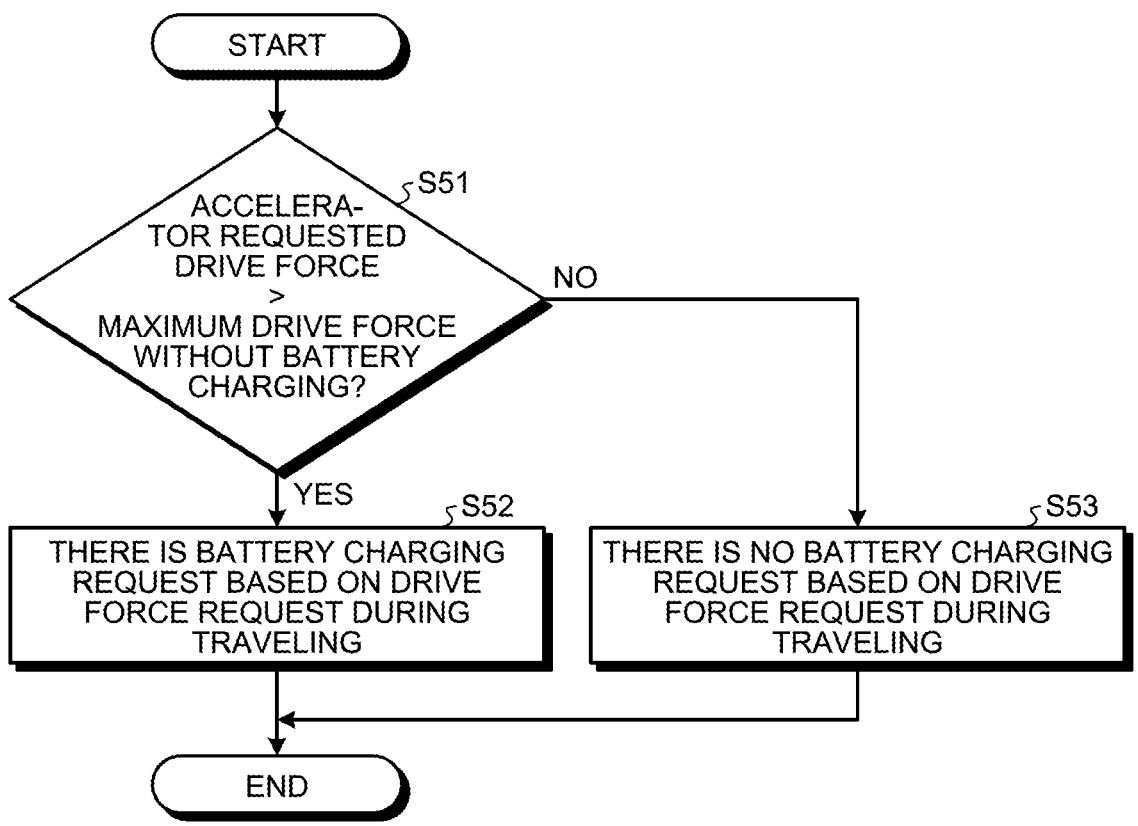
FIG. 3 is a flowchart illustrating details of a battery charging/discharging request determination process in the control method performed by the control device for the hybrid vehicle according to the embodiment of the present disclosure.

In the charging/discharging request determination process in Step S5 of FIG. 2 described above, more specifically, after determining the presence or absence of each of the charging/discharging requests in (1) to (5) described above, an arbitration of the charging/discharging requests are made in accordance with predetermined priorities of the charging/discharging request items. For example, in the above description, requests (1) to (5) are arranged in order (4)>(5)>(3) . . . in descending order of priority. Therefore, for example, when it is determined that the charging/discharging requests of (3) to (5) are present in the charging/discharging request determination process in this step, a higher priority is given to the charging/discharging request of (4) rather than those of (3) and (5).

Furthermore, in Step S6 of FIG. 2 described above, it is desired that the greater the accelerator requested drive force calculated in Step S2 is according to the priorities obtained in the arbitration of the charging/discharging requests in Step S5 and within the range where the other requests for changing the operating point of the engine are not received, the higher the set battery requested power.

Incidentally, as a result of the arbitration of the charging/discharging requests in Step S5 of FIG. 2 described above, a case is considered where the accelerator requested drive force cannot be achieved due to a higher charging/discharging request (hereinafter simplified as a "higher request") such as "(4): the battery protection request". In this case, the hybrid ECU 22 calculates, as a target drive force, a drive force that can be achieved under a restriction on the battery requested power. Specifically, the hybrid ECU 22 calculates an operating point at which the engine torque is maximized within the range of the engine power that can be taken under the restriction on the battery requested power, so that a drive force at this operating point can be used as the target drive force.

Method of Calculating Amount of Battery Requested Charge

Hereinafter, a method of calculating the amount of battery requested charge in Step S6 of FIG. 2 will be described with reference to FIG. 4. The hybrid ECU 22 calculates the amount of battery requested charge on the basis of the requested drive force for the hybrid vehicle 1, the maximum drive force without battery charging, and a maximum drive force with battery charging. It should be noted that the "maximum drive force with battery charging" herein refers to a drive force that can be output when the output of the second motor generator 14 is maximized and the battery 18 is charged.

First, equations of motion of the system of the hybrid vehicle 1 according to the present embodiment can be expressed by the following formulas (1) to (3).

$$Tp = Tm \times Grm - 1/\rho \times Tg = Tm \times Grm + 1/(1+\rho) \times Te \quad (1)$$

$$Te = -(1+\rho)/\rho \times Tg \quad (2)$$

$$Ne = \rho/(1+\rho) \times Ng + 1/(1+\rho) \times \_Np \quad (3)$$

Here, the meanings of the symbols in the above formulas (1) to (3) are as follows.
Tp: Output shaft torque (≈vehicle drive force)
Tm: MG2 torque
Tg: MG1 torque
Te: Engine torque
Np: Output shaft speed
Ne: Engine speed
Ng: MG1 rotation speed
ρ: Planetary gear ratio (number of tooth of sun gear/number of tooth of ring gear)
Grm: MG2 reduction gear ratio
1/(1+ρ)×Te: Engine direct torque Next, described is control which is performed in a state where an increase of the drive force is requested by an accelerator pedal request for the hybrid vehicle 1 traveling in condition (1) to increase the drive force before the vehicle speed is changed, that is, the control is performed when the engine speed has the upper limit value which is the same as the value at the condition (1). As described above, when the output of the second motor generator 14 is restricted and the MG2 torque Tm reaches the upper limit, it is possible to increase the output shaft torque Tp by increasing the engine torque as expressed in formula (1) described above.

At this time, in related-art control, in order to obtain the maximum drive force without battery charging, it is possible to shift the operating point of the engine from the condition (1) to condition (6) in FIG. 4. Accordingly, in a case where the accelerator requested drive force is in a region 1 of FIG. 4 when the accelerator requested drive force is converted into the engine torque Te, since the related-art control can be applied, the battery charging request in the control according to the present embodiment is not generated.

On the other hand, in a case where the accelerator requested drive force is in a region 2 of FIG. 4 when the accelerator requested drive force is converted into the engine torque Te, the operating point of the engine is shifted to obtain the accelerator requested drive force, and an excess output from the engine generated at that time is stored in the battery 18. Furthermore, in a case where the accelerator requested drive force is in a region 3 of FIG. 4 when the accelerator requested drive force is converted into the engine torque Te, since the accelerator requested drive force cannot exceed the drive force at the operating point of the engine in condition (7) until the vehicle speed increases. Therefore, (7) is defined as the maximum drive force point and the battery 18 is charged with an amount of charge requested at (7).

Part of the content described above is expressed by the following formula. In the equations of motion expressed in the above formulas (1) to (3), the related-art control is performed when the engine torque Te achieving the output shaft torque Tp is in the region 1 in FIG. 4 while the MG2 torque Tm is set to the upper limit and the output shaft torque Tp is controlled by the engine torque Te. In contrast, when the engine torque Te is in the region 2 in FIG. 4, since a plurality of operating points of the engine achieving a requested engine torque Te is in a rotation speed direction, an adaptation policy is decided to determine the engine speed Ne.

As the "adaptation policy", for example, a selection of an optimal fuel efficiency point (fuel efficient operating line) from candidates for the operating point of the engine, a selection of the engine torque on the WOT operating line by considering a response speed thereafter may be applied. Here, when the determined operating point of the engine is given as Te' [Nm] and Ne' [rpm] and the operating point (6) of the engine, which is the maximum drive force point without battery charging in normal control, is given as Te [Nm] and Ne [rpm], then an excess engine output [kW] upon obtaining the vehicle drive force is expressed as (2×π×Te'×Ne'/60000)−(2×π×Te×Ne/60000). This excess engine output can be calculated as the amount of battery requested charge.

Furthermore, in the region 3 of FIG. 4, the amount of battery requested charge at the operating point (7) of the engine can also be calculated by using the similar calculation.

Method of Calculating Engine Torque

Hereinafter, the above-described method of calculating the engine torque in Step S9 of FIG. 2 will be described. The hybrid ECU 22 calculates the engine torque on the basis of the requested drive force for the hybrid vehicle 1, the maximum drive force without battery charging, and a maximum drive force with battery charging.

Here, in the "Method of calculating amount of battery requested charge" described above, since the operation range of the operating points of the engine is assumed, basically, the engine torque used for calculation of the amount of battery requested charge is used. However, as a result of the arbitration of the charging/discharging request in Step S5 of FIG. 2, if there is the higher request, an engine torque achieved during restriction of the battery requested power which is the higher charging/discharging request is calculated as an engine torque for ensuring the drive force.

For example, in a case where on the basis of the accelerator requested drive force, an amount of battery requested charge (sign on charging side: positive) determined by the control according to the present embodiment is given as Pb [kW]e, an operating point of the engine at that time is given as Te [Nm] and Ne [rpm], the upper limit of the amount of charge in the battery according to the higher request (for example, "(4) battery protection request") (Pb>Pb') is given as Pb' [kW], an operating point of the engine at that time is given as Te' [Nm] and Ne' [rpm], and an operating point of the engine at the maximum drive force point without battery charging is given as Te0 [Nm] and Ne0 [rpm], when there is no higher request, "Te" of the operating point Te and Ne of the engine satisfying "Pb=(2×π×Te×Ne/60000)−(2×π×Te0× Ne0/60000)" is calculated as the engine torque. In contrast, when there is the higher request, "Te'" of the operating points Te' and Ne' of the engine satisfying "Pb'=(2×π×Te'× Ne'/60000)−(2×π×Te0×Ne0/60000)" is calculated as the engine torque.

Trial Calculation Example of Drive Force Improvement Rate

Hereinafter, a trial calculation example of a drive force improvement rate by using the control device for the hybrid vehicle 1 according to the present embodiment will be described with reference to FIG. 4 and Table 1.

TABLE 1

| Engine operating point | Battery charge/ discharge | Drive force improvement rate relative to (1) [%] | Direct drive force improvement rate relative to (1) [%] | MG2 drive force improvement rate relative to (1) [%] |
|---|---|---|---|---|
| (1) | N/A | Reference | Reference | Reference |
| (2) | N/A | 2.7 | 0.1 | 3.4 |
| (3) | Charge | 3.0 | 1.6 | 3.4 |
| (4) | Discharge | 5.1 | 12.2 | 3.4 |
| (5) | N/A | 3.4 | 3.4 | 3.4 |
| (6) | Discharge | 5.4 | 13.3 | 3.4 |
| (7) | Charge | 6.0 | 16.5 | 3.4 |

Table 1 illustrates a trial calculation example of the drive force improvement rate at the operating points (2) to (7) of the engine relative to the operating point (1) of the engine illustrated in FIG. 4. In this trial calculation, since it is assumed that the output of the second motor generator 14 is limited to the maximum output, the "MG2 drive force improvement rates relative to (1) [%]" at the operating points (2) to (7) of the engine, which are illustrated in the rightmost column, are the same values. In addition, in this trial calculation, it is assumed that both electric loss and drive loss are zero and the charge/discharge of the battery 18 is carried out so that the output of the second motor generator 14 is maximized at each of the operating points (1) to (7) of the engine.

The point (1) refers to a reference operating point of the engine and shows, for example, a condition in which the hybrid vehicle 1 is in steady running and the battery 18 is not charged/discharged. The point (2) indicates a condition in which the operating point of the engine is shifted from (1) along the fuel efficient operating line. By shifting the operating point of the engine from (1) to (2), the output of the engine 11 increases and the drive force also improves.

The point (3) indicates a condition in which the operating point of the engine is shifted from (2) along the fuel efficient operating line. In Table 1, the point (3) indicates "Battery charge/discharge: Charge". However, when the vehicle speed increases, the output of the second motor generator 14 also increases. Therefore, charging is not required. The point (4) indicates a condition in which the operating point of the engine is shifted from (1) along a constant engine output contour line so that the drive force is improved while the engine 11 is kept to provide a constant output.

The point (5) indicates an output of the engine 11 increased from (1) to the upper limit of acceptance of the second motor generator 14 without charging the battery. The point (6) illustrates a condition in which the operating point of the engine is shifted from (5) along a constant engine output contour line so that the drive force is improved while the engine 11 is kept to provide a constant output.

The point (7) indicates that the output of the engine 11 from (5) is improved by permitting the charging of the battery 18. In this way, shifting the operating point of the engine from (5) to (7) or shifting the operating point of the engine from (1) to (7) enables to obtain the highest drive force when compared to the reference operating point (1) of the engine.

Here, it is also possible to shift the operating point of the engine from (1) to any of (2) to (6) in the related-art control. That is, the point where the maximum drive force is obtained in the related-art control is the point (6). In contrast, shifting the operating point of the engine from (1) to (7) cannot be achieved in the related-art control and can be achieved only in the control according to the present embodiment. That is, the point where the maximum drive force is obtained in the control according to the present embodiment is the point (7). Even when the operating point of the engine shifts from (1) to (7), the engine speed does not change, thereby obtaining a good response. Furthermore, in the control according to the present embodiment, depending on a charge acceptance or a State Of Charge (SOC) of the battery 18, a dot-hatched region of FIG. 4 can also be selected as the operating point of the engine, so as to further increase the drive force.

Although the control device for a hybrid vehicle according to the present disclosure has been described in the particular embodiment(s), the gist of the present disclosure is not limited to these descriptions and should be interpreted broadly on the basis of the descriptions of the claims. Furthermore, it is needless to say that various changes, modifications and the like made on the basis of these descriptions are included in the spirit and the scope of the present disclosure.

According to an embodiment, even when an output of the second motor generator is limited, the control device for a hybrid vehicle can obtain a large drive force and improve the acceleration performance.

According to an embodiment, when an accelerator requested drive force exceeds the maximum drive force without battery charging and a large drive force is required, the control device for the hybrid vehicle causes the hybrid vehicle to travel while charging a battery and increasing engine direct torque which is directly and mechanically transmitted to an output shaft via a planetary gear mechanism from an engine. Accordingly, even when there is a restriction on the output of the second motor generator and the output of the second motor generator is limited (or the output itself is small), it is possible to respond to a large requested drive force.

According to an embodiment, the control device for a hybrid vehicle can optimally control the target engine speed in accordance with the battery requested power.

According to an embodiment, by selecting the engine torque on the WOT operating line, the control device for the hybrid vehicle can improve the drive force while minimizing the electrical loss and the driving loss.

According to an embodiment, the control device for the hybrid vehicle supplies the electric power stored in the battery to the accessories to prevent an excessive amount of charge in the battery caused by charging operation.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A control device for a hybrid vehicle comprising:
   an engine;
   an output shaft connected to a drive wheel;
   a first motor generator configured to generate an electric power using a drive force from the engine;
   a second motor generator connected to the output shaft;
   a planetary gear mechanism mechanically connected to the engine, the first motor generator, and the output shaft;
   a battery configured to charge with the electric power generated by the first motor generator; and
   controllers configured to control the engine, the first motor generator, and the second motor generator,
   wherein the controllers are configured to, when a requested drive force for the hybrid vehicle is greater than a maximum drive force without battery charging, which represents a drive force which is output when an output of the second motor generator is maximized and the battery is not charged, cause the hybrid vehicle to travel while charging the battery,
   wherein the controllers are configured to calculate an amount of a requested charge of the battery on a basis of a charging/discharging request for operation at a fuel efficiency point of the engine, a charging request based the requested drive force, and a battery protection request, the battery protection request being given a higher priority in the calculation of the amount of the requested charge of the battery than the charging/discharging request for the operation at the fuel efficiency point of the engine and the charging request based the requested drive force,
   wherein the controllers are configured to calculate a battery requested power on a basis of the amount of the requested charge of the battery, such that the requested battery power directly correlates to the requested drive force when the charging/discharging request for operation at the fuel efficiency point of the engine and the battery protection request are not received, and
   wherein the controllers are configured to maintain or increase a rotation speed of the engine when the fuel efficiency point of the engine is changed.

2. The control device for a hybrid vehicle according to claim 1, wherein the controllers are configured to, when the requested drive force is greater than the maximum drive force without battery charging, supply an electric power stored in the battery to accessories provided in the hybrid vehicle and cause the battery to discharge the electric power.

3. The control device for a hybrid vehicle according to claim 1, wherein the controllers are configured to, when the requested drive force is greater than the maximum drive force without battery charging, calculate the amount of the requested charge of the battery on the basis of the requested drive force, calculate the battery requested power on the basis of the amount of battery requested charge, and calculate a target engine speed on the basis of the battery requested power.

4. The control device for a hybrid vehicle according to claim 3, wherein the controllers are configured to calculate the amount of battery requested charge on the basis of the requested drive force, the maximum drive force without battery charging, and a maximum drive force with battery charging, which indicates a drive force which is output when an output of the second motor generator is maximized and the battery is charged.

5. The control device for a hybrid vehicle according to claim 4, wherein the controllers are configured to calculate an engine torque on a basis of the requested drive force, the maximum drive force without battery charging, and the maximum drive force with battery charging.

6. The control device for a hybrid vehicle according to claim 5, wherein the control unit is configured to calculate the engine torque on a wide open throttle (WOT) operating line indicating engine speeds at which the engine outputs maximum torques.

* * * * *